US00RE37694E

(19) United States
(12) Reissued Patent
Riccobene

(10) Patent Number: US RE37,694 E
(45) Date of Reissued Patent: May 14, 2002

(54) GARDEN EDGER

(75) Inventor: Thomas S. Riccobene, Albuquerque, NM (US)

(73) Assignee: Riccobene Masonry Company, Inc., Albuquerque, NM (US)

(21) Appl. No.: 29/106,621

(22) Filed: Jun. 16, 1999

Related U.S. Patent Documents

Reissue of:
(64) Patent No.: Des. 388,290
Issued: Dec. 30, 1997
Appl. No.: 29/059,150
Filed: Sep. 4, 1996

(51) LOC (6) Cl. ..... 08-05
(52) U.S. Cl. ..... D8/1
(58) Field of Search ..... D8/1, 113, 382; D25/35, 113, 118, 131, 133, 164, 199; 47/23, 33, 41.14; 52/102, 103, 155, 156, 590.2, 653.2; 403/65, 93, 169, 170, 205, 217, 381

(56) References Cited

U.S. PATENT DOCUMENTS

| | | | | |
|---|---|---|---|---|
| 1,870,102 | A | | 8/1932 | Davies |
| 2,228,763 | A | | 1/1941 | Henderson |
| 2,605,681 | A | | 8/1952 | Trief |
| 3,373,668 | A | | 3/1968 | Moore et al. |
| 3,537,687 | A | | 11/1970 | Adelman |
| 3,885,752 | A | | 5/1975 | Noffsinger |
| 4,107,894 | A | | 8/1978 | Mullins |
| 4,128,357 | A | | 12/1978 | Barth et al. |
| 4,326,817 | A | | 4/1982 | Boiardi |
| 4,544,305 | A | | 10/1985 | Hair |
| 4,884,920 | A | | 12/1989 | Perazzi |
| 5,003,746 | A | | 4/1991 | Wilston |
| 5,080,523 | A | | 1/1992 | Steiner |
| 5,108,219 | A | | 4/1992 | Hair |
| 5,119,587 | A | | 6/1992 | Waltz |
| 5,154,032 | A | | 10/1992 | Ritter |
| 5,173,003 | A | | 12/1992 | Hair |
| 5,186,574 | A | | 2/1993 | Tavares |
| 5,259,154 | A | | 11/1993 | Lilley |
| D355,340 | S | * | 2/1995 | Scott, Jr. et al. ..... D8/1 |
| 5,441,364 | A | | 8/1995 | Dressler |
| 5,548,938 | A | | 8/1996 | Scheiwiller |

FOREIGN PATENT DOCUMENTS

| | | |
|---|---|---|
| DE | 4137814 A | 5/1993 |
| IT | 345117 | 12/1936 |
| NL | 110004 | 11/1964 |

OTHER PUBLICATIONS

LPS Pavement Co. brochure entitled "Pavestone Co. Modulare Concrete Beauty", 1992.
Sweets General Building and Renovation Catalog Anchor, 1994.
Rockwood Retaining Walls, Inc., Classic Edge Brochure, 1997.

* cited by examiner

*Primary Examiner*—Holly Baynham
(74) *Attorney, Agent, or Firm*—Greer, Burns & Crain, Ltd.

(57) CLAIM

I claim the ornamental design for the garden edger, as shown.

DESCRIPTION

Figure 2:
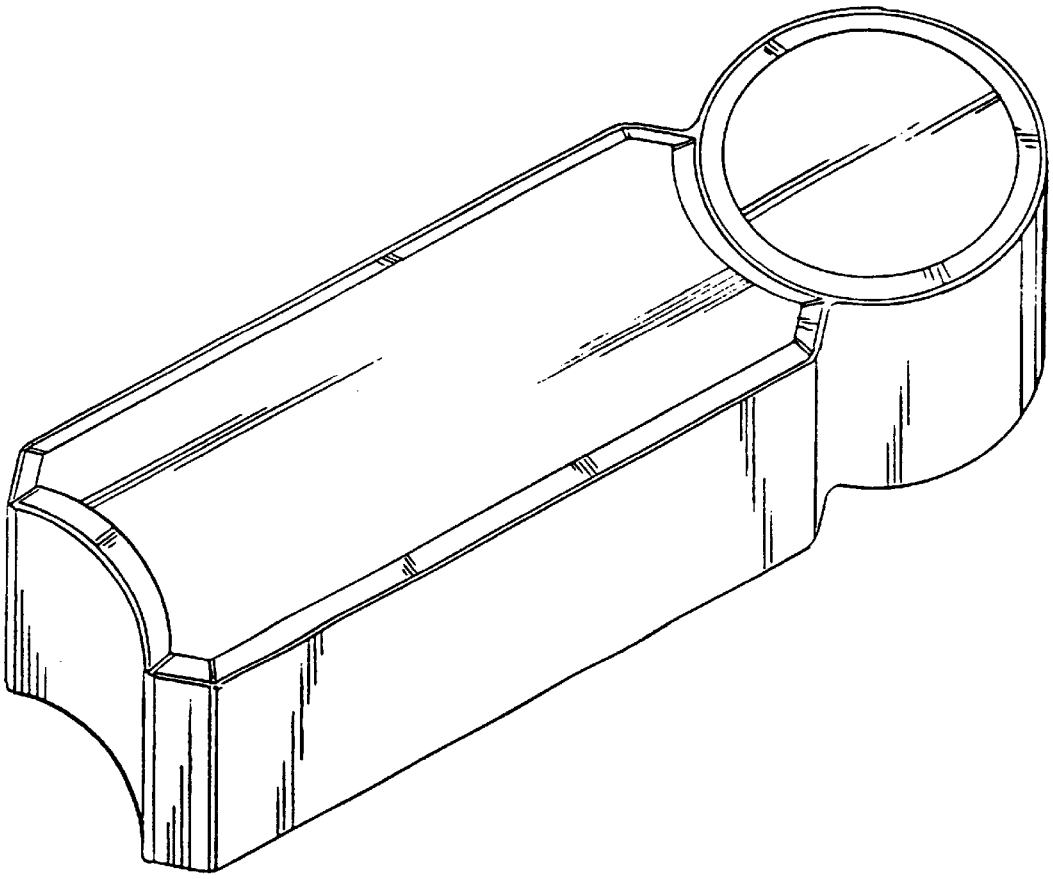
Figure 3:
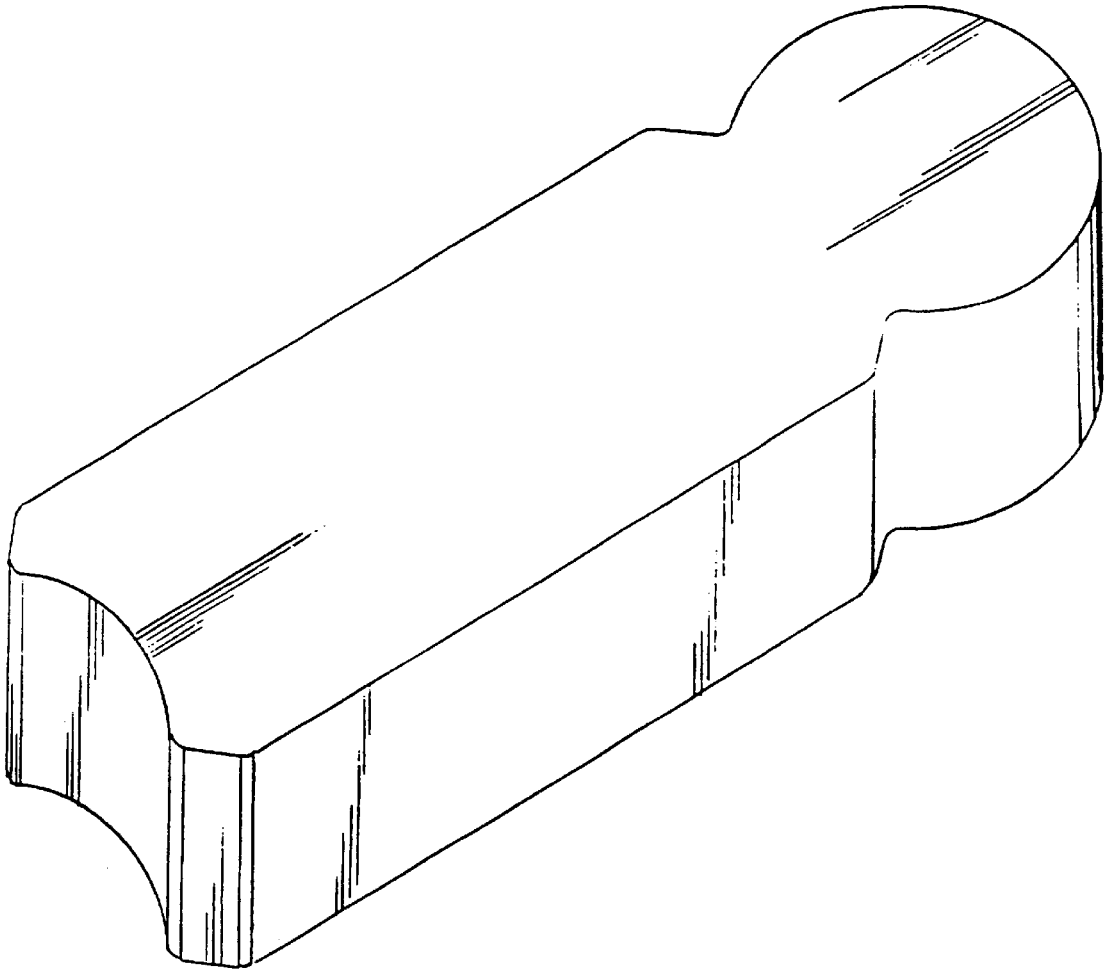
Figure 4:
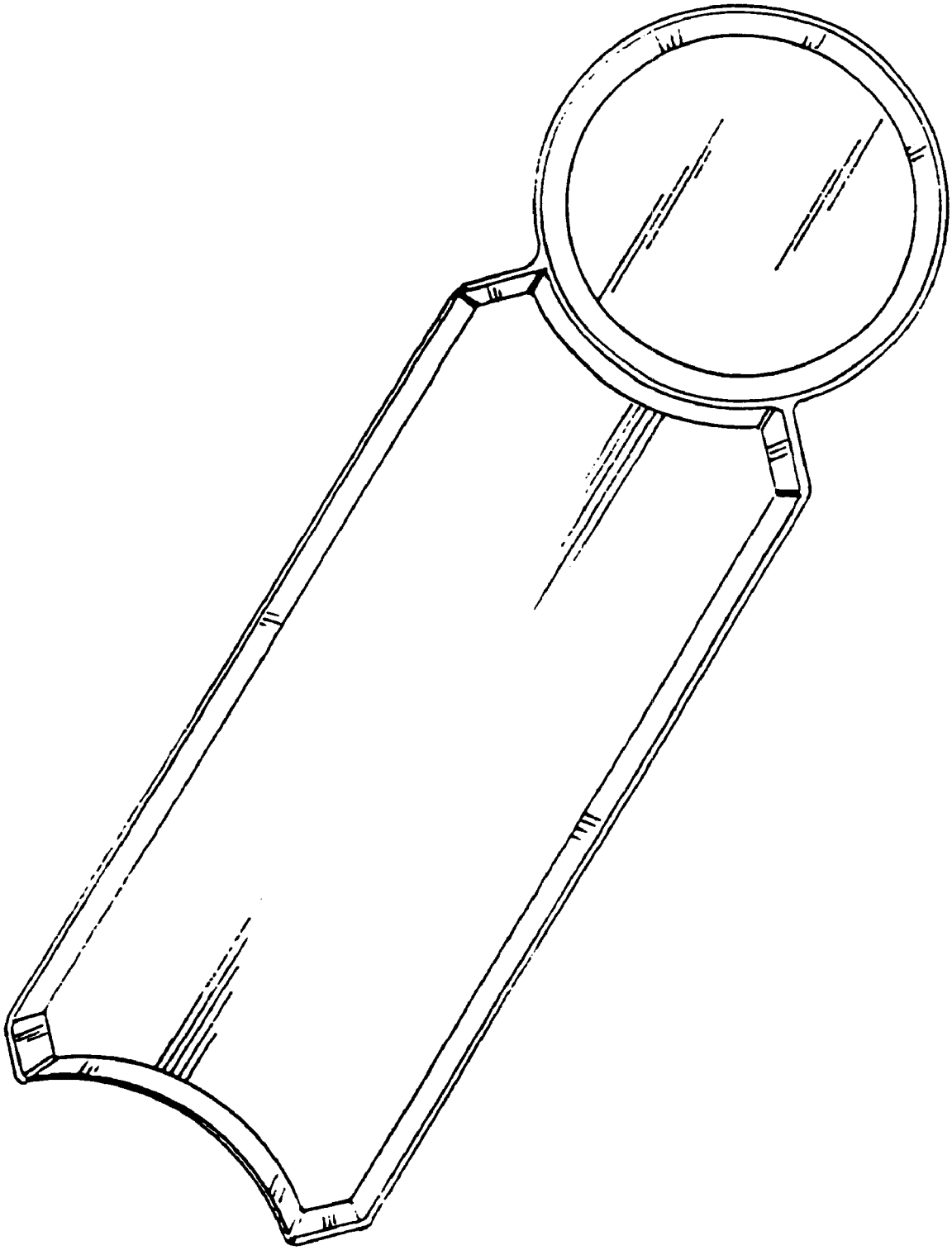
Figure 5:
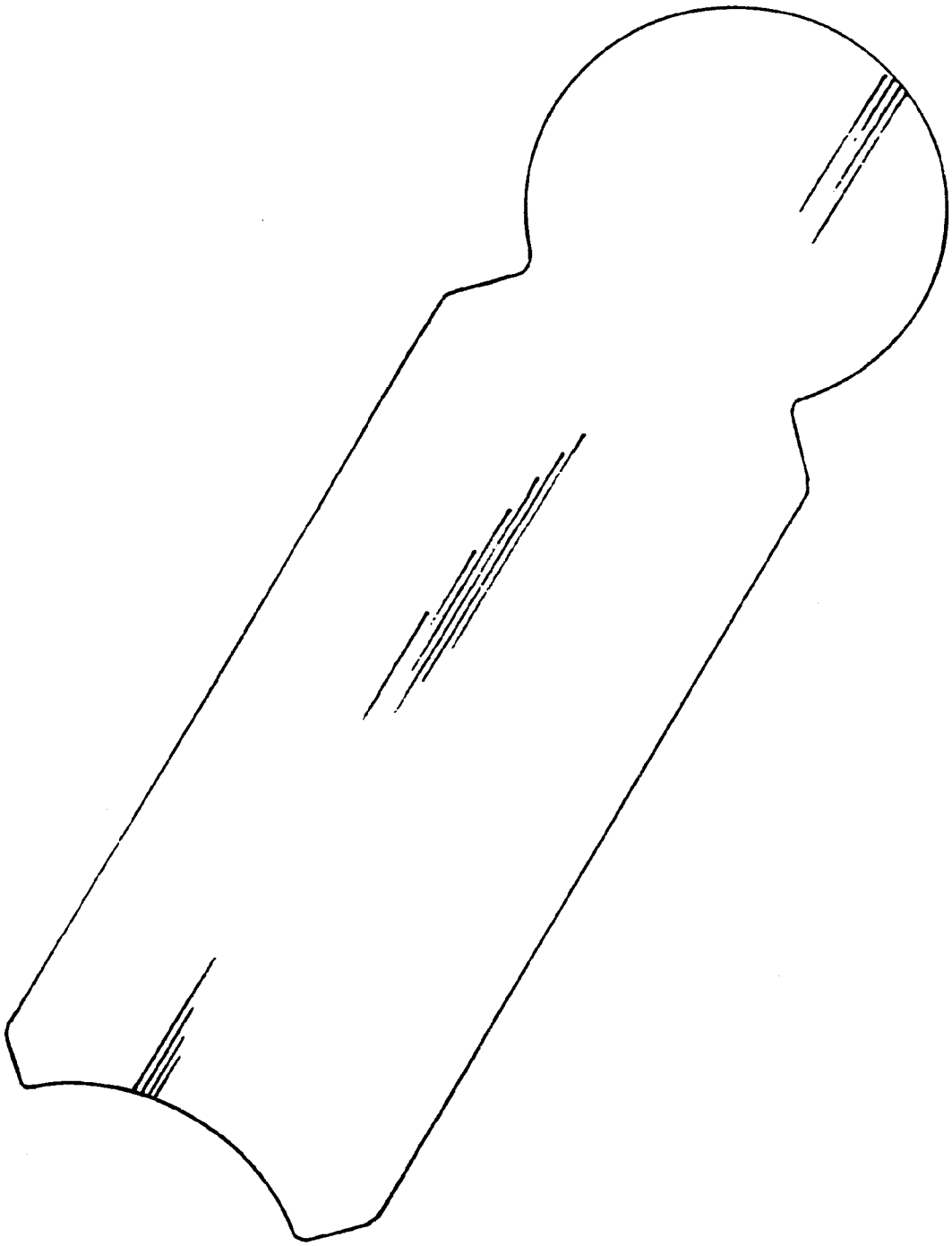
Figure 2:
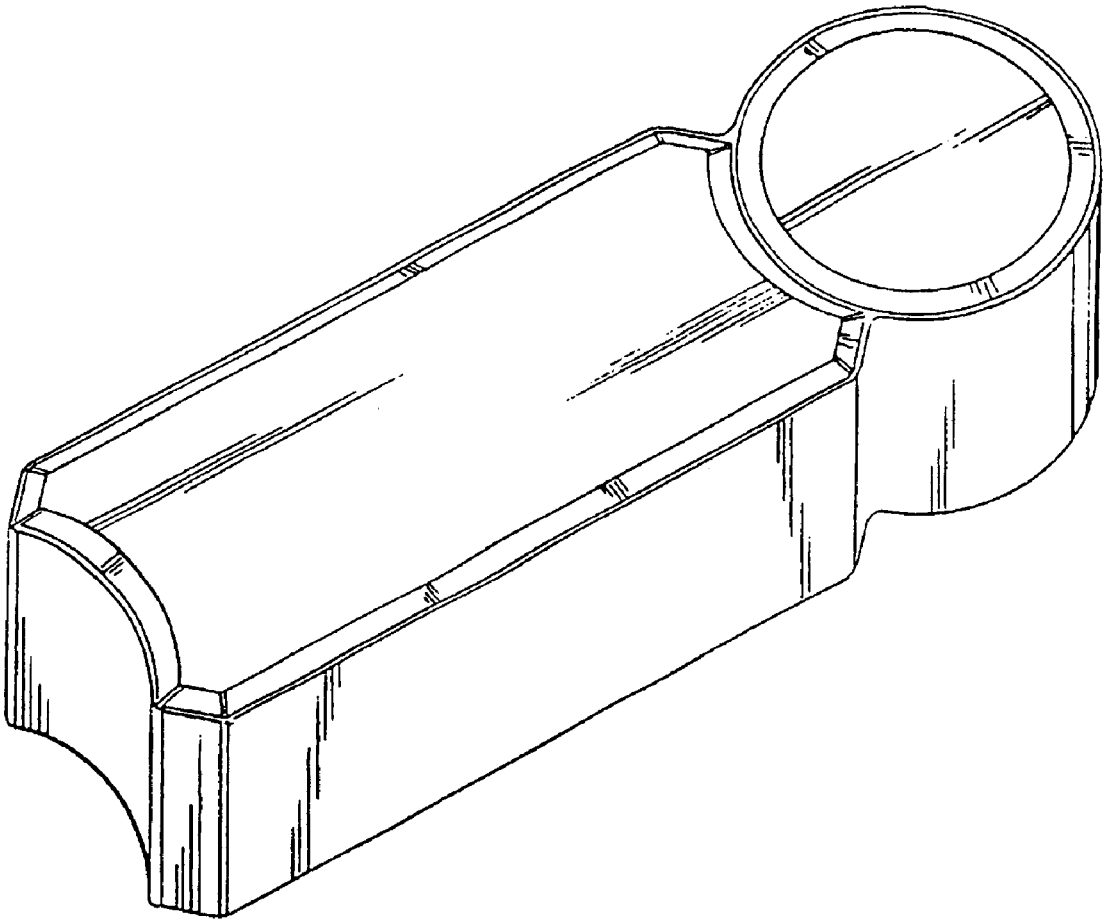
Figure 3:
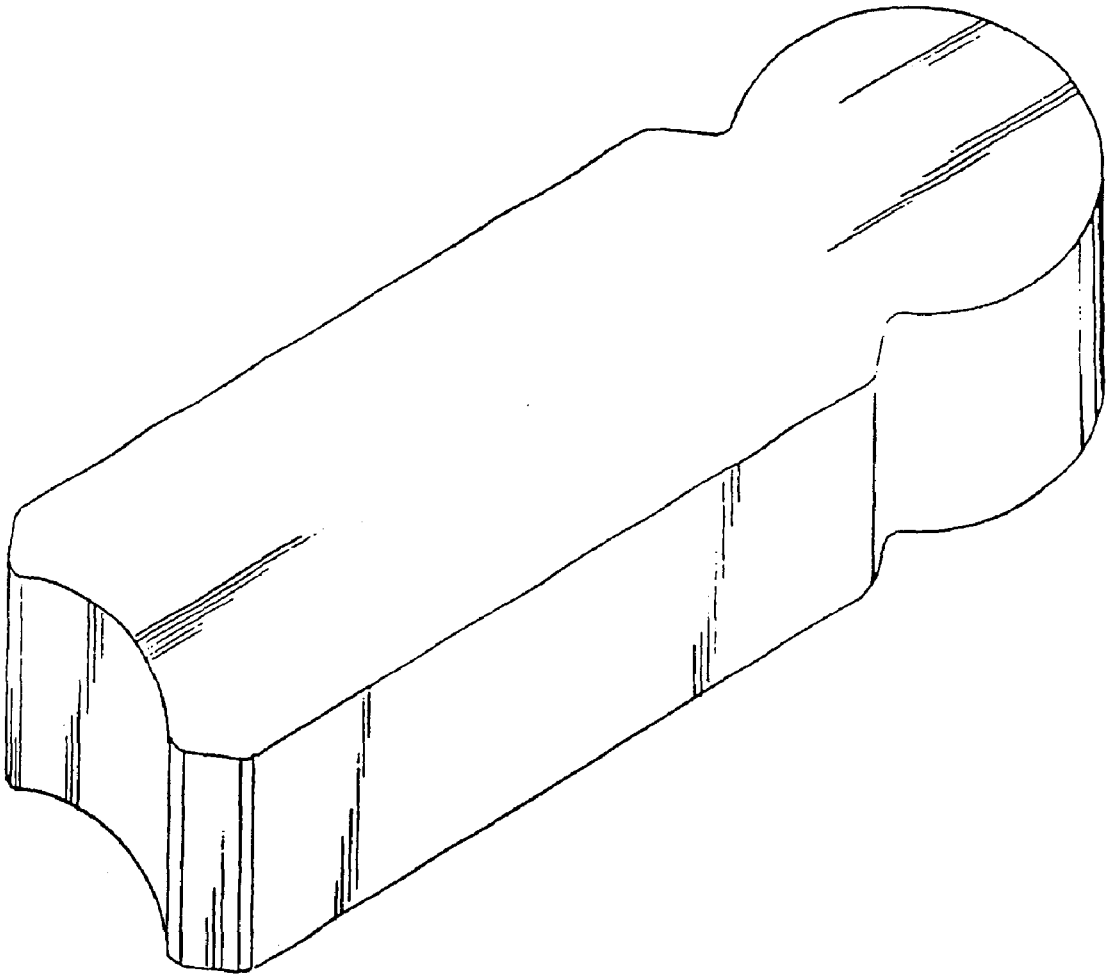
Figure 4:
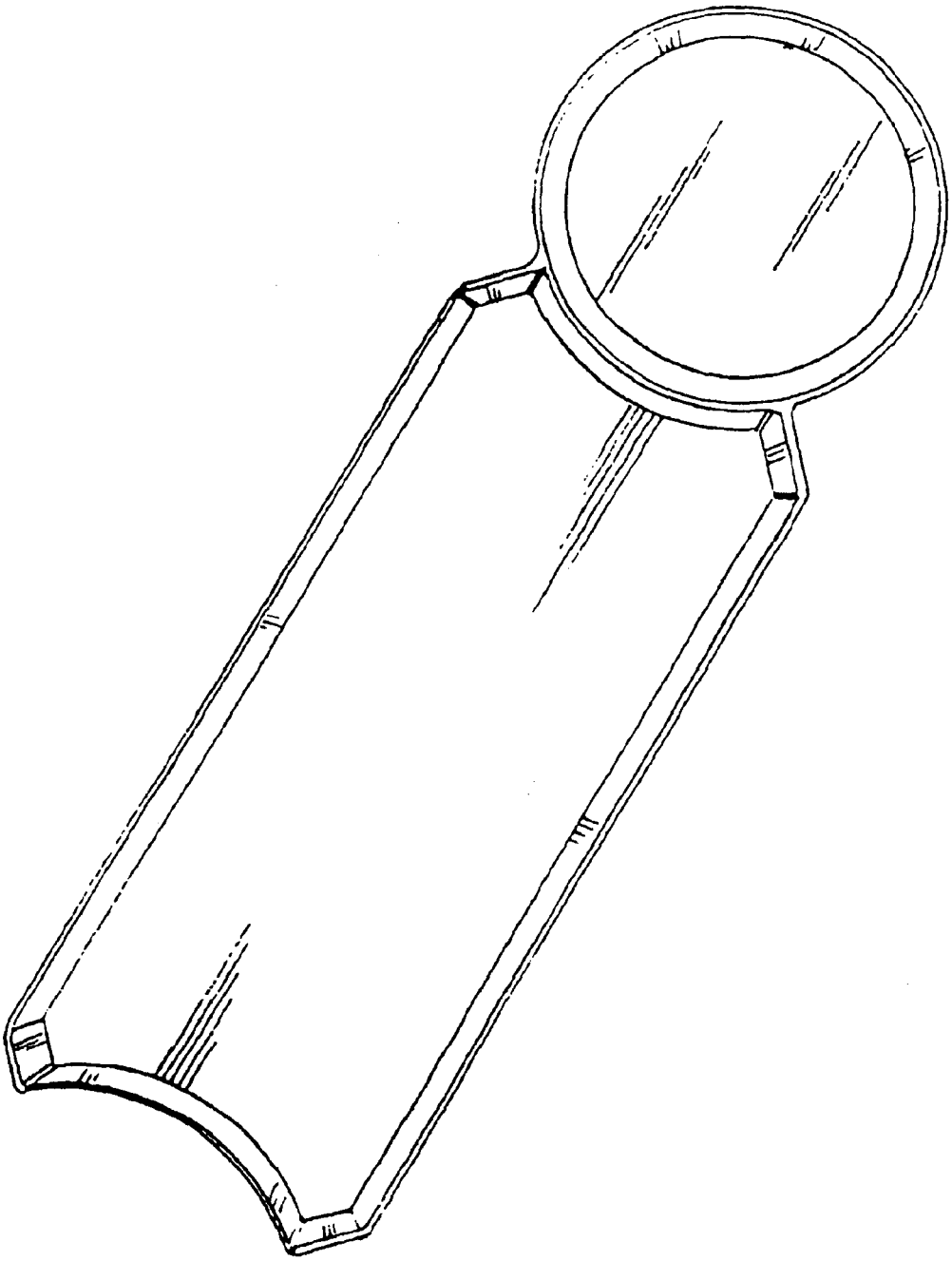
Figure 5:
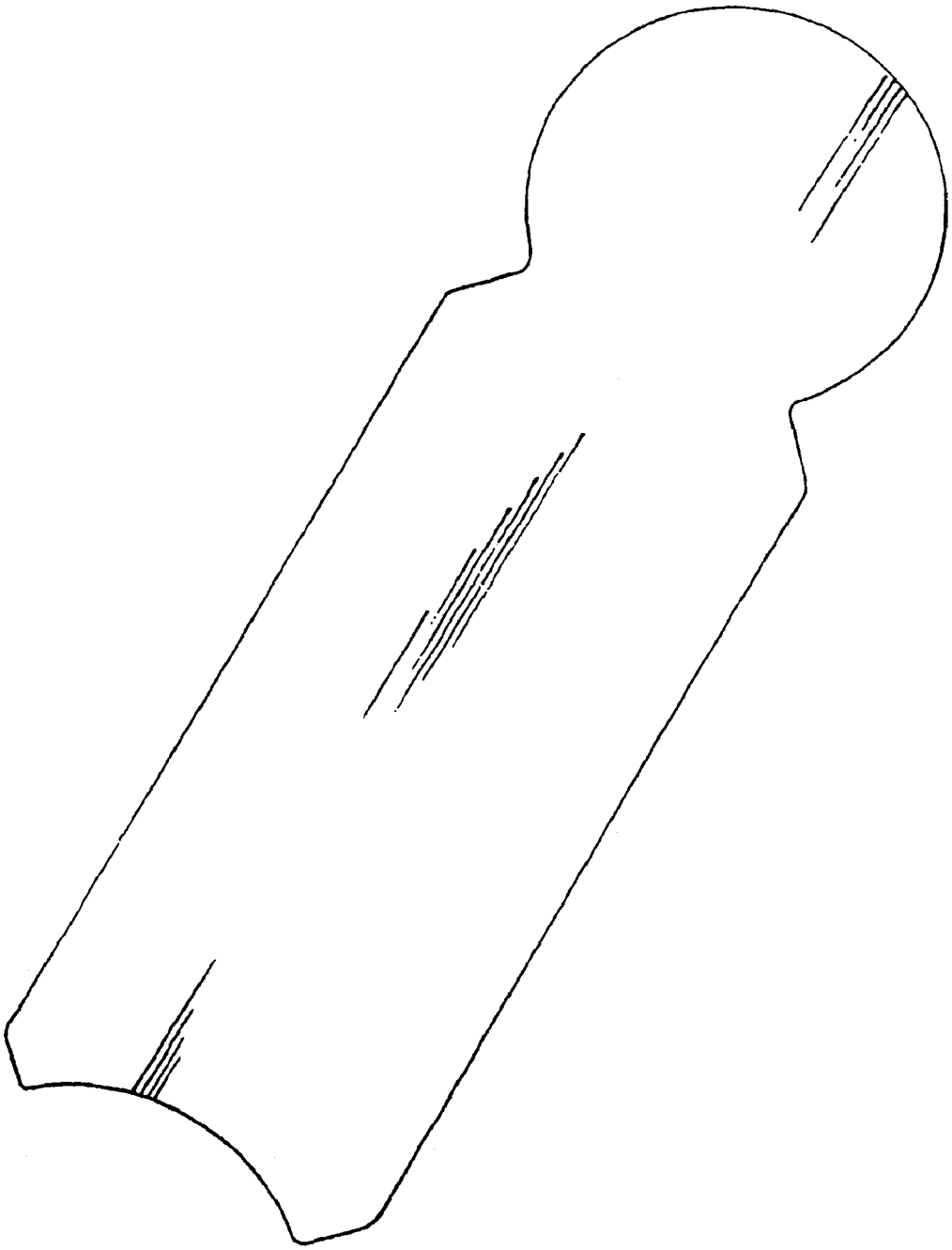

FIG. 1 is a front top perspective view of my ornamental dsign;
FIG. 2 is a rear top perspective view of my ornamental design shown in FIG. 1;
FIG. 3 is a bottom view of my ornamental design shown in FIG. 2;
FIG. 4 is a top plan view of my ornamental design; and,
FIG. 5 is a botton plan view of my ornamental design.

1 Claim, 5 Drawing Sheets

---

Matter enclosed in heavy brackets [ ] appears in the original patent, but forms no part of this reissue; matter printed in italics indicates the additions made by reissue.

(New)

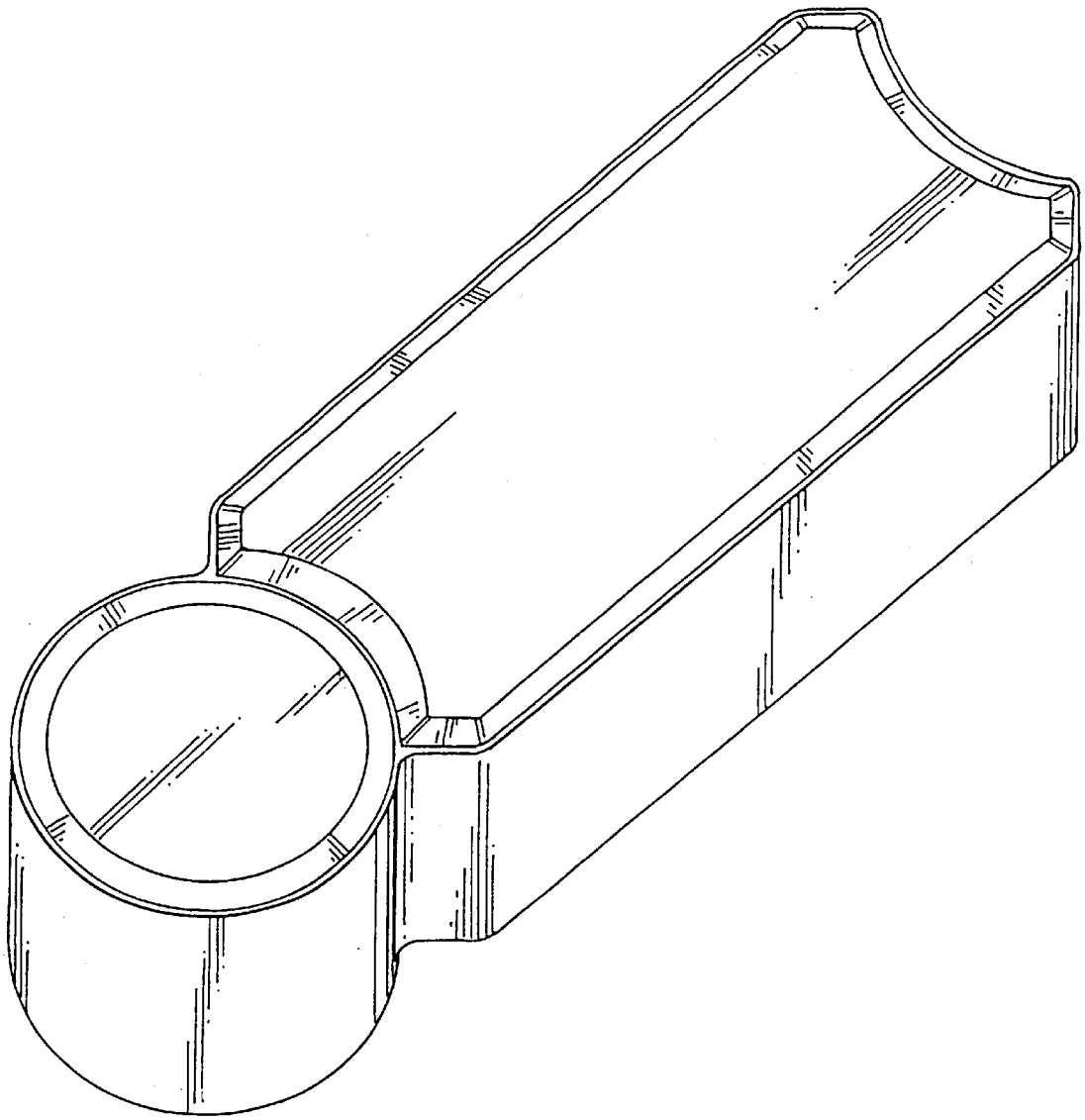
Fig. 1 (New)

UNITED STATES PATENT AND TRADEMARK OFFICE

CERTIFICATE OF CORRECTION

PATENT NO. : RE 37,694 E
DATED : May 14, 2002
INVENTOR(S) : Thomas S. Riccobene

It is certified that error appears in the above-identified patent and that said Letters Patent is hereby corrected as shown below:

Delete the title page and insert therefore the attached title page.

Delete Drawing Sheets 1-5 and substitute therefore the attached Drawing Sheets 1-6

Signed and Sealed this

Fifth Day of August, 2003

JAMES E. ROGAN
*Director of the United States Patent and Trademark Office*

(19) United States
(12) Reissued Patent
Riccobene

(10) Patent Number: US RE37,694 E
(45) Date of Reissued Patent: May 14, 2002

(54) GARDEN EDGER

(75) Inventor: Thomas S. Riccobene, Albuquerque, NM (US)

(73) Assignee: Riccobene Masonry Company, Inc., Albuquerque, NM (US)

(21) Appl. No.: 29/106,621

(22) Filed: Jun. 16, 1999

Related U.S. Patent Documents

Reissue of:
(64) Patent No.: Des. 388,290
Issued: Dec. 30, 1997
Appl. No.: 29/059,150
Filed: Sep. 4, 1996

(51) LOC (6) Cl. ..... 08-05
(52) U.S. Cl. ..... D8/1
(58) Field of Search ..... D8/1, 113, 382; D25/35, 113, 118, 131, 133, 164, 199; 47/23, 33, 41.14; 52/102, 103, 155, 156, 590.2, 653.2; 403/65, 93, 169, 170, 205, 217, 381

(56) References Cited

U.S. PATENT DOCUMENTS

| | | | | |
|---|---|---|---|---|
| 1,870,102 | A | | 8/1932 | Davies |
| 2,228,763 | A | | 1/1941 | Henderson |
| 2,605,681 | A | | 8/1952 | Trief |
| 3,373,668 | A | | 3/1968 | Moore et al. |
| 3,537,687 | A | | 11/1970 | Adelman |
| 3,885,752 | A | | 5/1975 | Noffsinger |
| 4,107,894 | A | | 8/1978 | Mullins |
| 4,128,357 | A | | 12/1978 | Barth et al. |
| 4,326,817 | A | | 4/1982 | Boiardi |
| 4,544,305 | A | | 10/1985 | Hair |
| 4,884,920 | A | | 12/1989 | Perazzi |
| 5,003,746 | A | | 4/1991 | Wilston |
| 5,080,523 | A | | 1/1992 | Steiner |
| 5,108,219 | A | | 4/1992 | Hair |
| 5,119,587 | A | | 6/1992 | Waltz |
| 5,154,032 | A | | 10/1992 | Ritter |
| 5,173,003 | A | | 12/1992 | Hair |
| 5,186,574 | A | | 2/1993 | Tavares |
| 5,259,154 | A | | 11/1993 | Lilley |
| D355,340 | S | * | 2/1995 | Scott, Jr. et al. ..... D8/1 |
| 5,441,364 | A | | 8/1995 | Dressler |
| 5,548,938 | A | | 8/1996 | Scheiwiller |

FOREIGN PATENT DOCUMENTS

| | | |
|---|---|---|
| DE | 4137814 A | 5/1993 |
| IT | 345117 | 12/1936 |
| NL | 110004 | 11/1964 |

OTHER PUBLICATIONS

LPS Pavement Co. brochure entitled "Pavestone Co. Modulare Concrete Beauty", 1992.
Sweets General Building and Renovation Catalog Anchor, 1994.
Rockwood Retaining Walls, Inc., Classic Edge Brochure, 1997.

* cited by examiner

*Primary Examiner*—Holly Baynham
(74) *Attorney, Agent, or Firm*—Greer, Burns & Crain, Ltd.

(57) CLAIM

I claim the ornamental design for the garden edger, as shown.

DESCRIPTION

FIG. 1 is a front top perspective view of my ornamental dsign;
FIG. 2 is a rear top perspective view of my ornamental design shown in FIG. 1;
FIG. 3 is a bottom view of my ornamental design shown in FIG. 2;
FIG. 4 is a top plan view of my ornamental design; and,
FIG. 5 is a botton plan view of my ornamental design.

1 Claim, 6 Drawing Sheets

Matter enclosed in heavy brackets [ ] appears in the original patent, but forms no part of this reissue; matter printed in italics indicates the additions made by reissue.

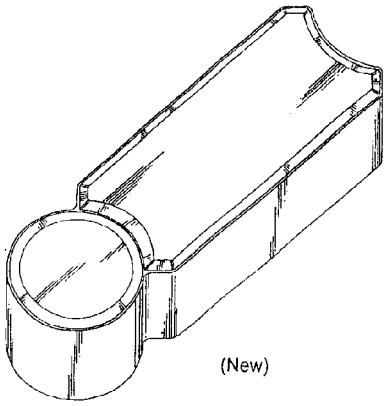

(New)

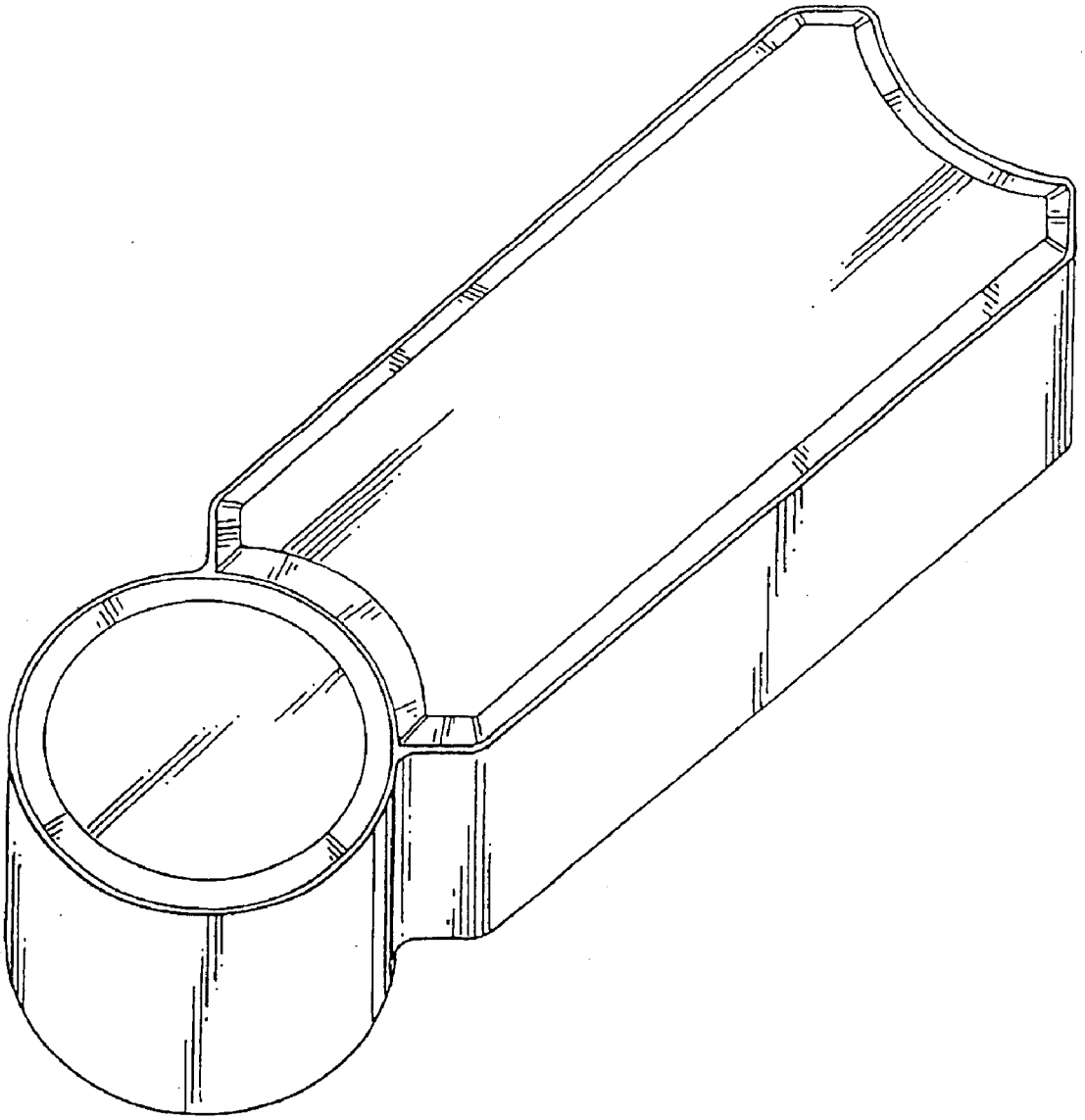
Fig. 1 (New)

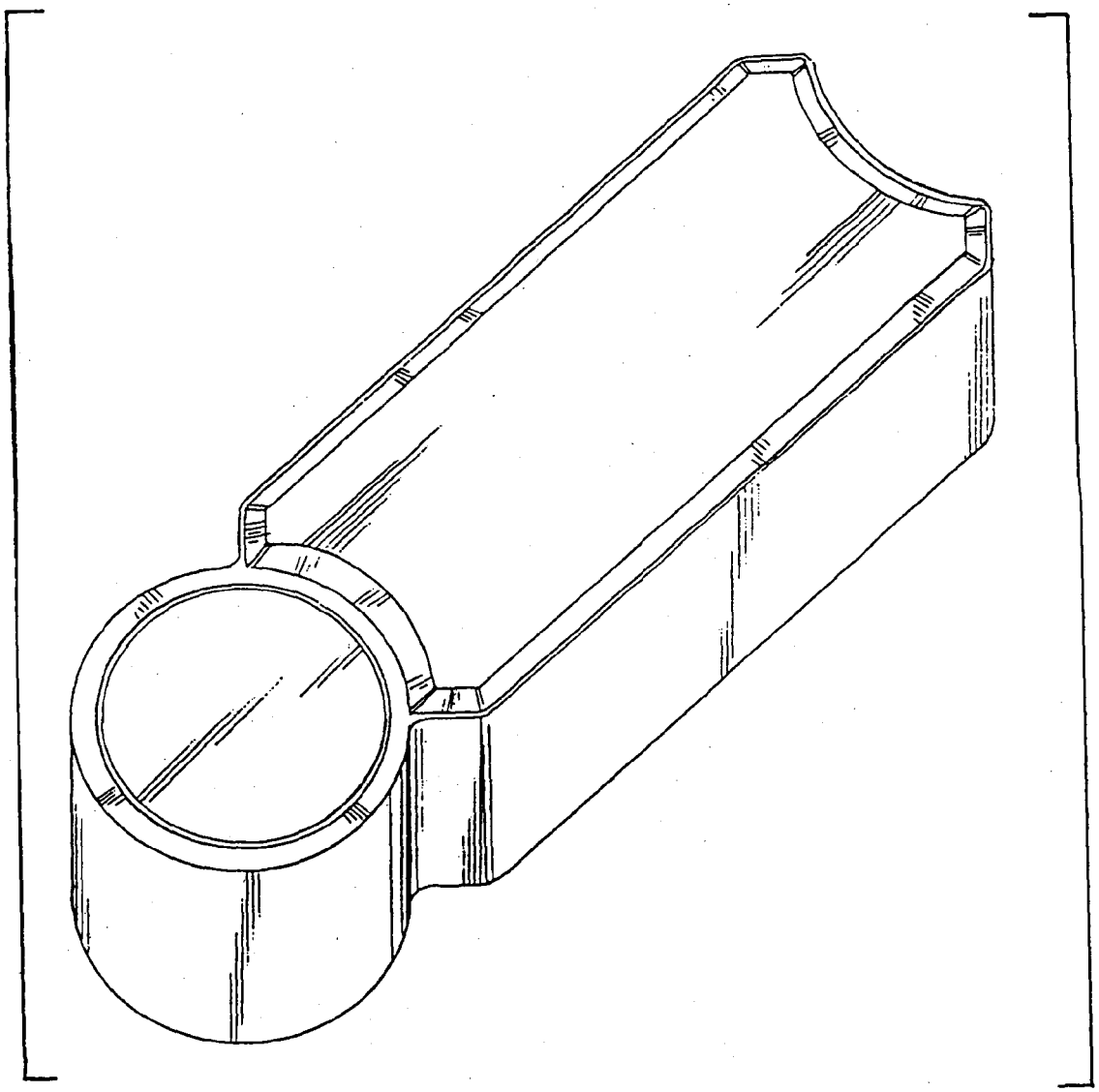
Fig. 1 (Canceled)